United States Patent [19]
Furuhashi

[11] Patent Number: 5,640,489
[45] Date of Patent: Jun. 17, 1997

[54] AUDIO SYNTHESIZER TIME-SHARING ITS FIRST MEMORY UNIT BETWEEN TWO PROCESSORS

[75] Inventor: Makoto Furuhashi, Kanagawa, Japan

[73] Assignee: Sony Corporation, Tokyo, Japan

[21] Appl. No.: 330,840

[22] Filed: Oct. 27, 1994

[30] Foreign Application Priority Data

Oct. 27, 1993 [JP] Japan .................................. 5-268905

[51] Int. Cl.$^6$ .............................. G01H 7/02; G10K 15/02
[52] U.S. Cl. ........................ 395/2.95; 395/2.67; 395/474; 84/604; 84/627
[58] Field of Search ...................... 395/2.67, 474, 395/477, 494, 495, 492, 2.95; 84/600, 601, 602, 622, 604, 627; 381/34, 51

[56] References Cited

U.S. PATENT DOCUMENTS 5,404,455  4/1995  Daly et al. .............................. 395/275

*Primary Examiner*—Ayaz R. Sheikh
*Assistant Examiner*—Tálivaldis Ivars Šmits
*Attorney, Agent, or Firm*—William S. Frommer; Alvin Sinderbrand

[57] ABSTRACT

An apparatus for processing the speech information includes a first execution device and a second execution device for executing operations at respective different execution cycles, and a first memory unit for reading and recording the speech information. The first execution device and the second execution device exploit the first memory unit in common for processing the speech information. The processing apparatus further includes a second memory unit for storage of the speech information from the first execution device or the speech information read out from the first memory unit. The first execution device records the speech information on or reads the speech information from the second memory unit during the execution cycle of the first execution device. The second execution device accesses the first memory unit during the execution cycle of the second execution device for outputting the speech information to outside. The speech information recorded in the second memory unit is read out and recorded in the first memory unit or the speech information recorded in the first memory unit is read out recorded in the second memory unit during the time of not accessing the first memory unit. The data transfer between first execution device and the second memory can be performed during the execution cycle of the first execution device, while that between the second memory unit and the first memory unit can be performed during the execution cycle of the second execution device, so that it is possible for the first execution device to perform data transfer independently, such that sound source data can be transferred at a higher speed by employing a high-speed device as the first execution device.

10 Claims, 9 Drawing Sheets

FIG.3(a) DSP CLOCKS
FIG.3(b) TIME-DIVISIONAL SIGNAL
FIG.3(c) CPU CLOCKS
FIG.3(d) CPU MACHINE CYCLE

| ADDRESS | REGISTER | |
|---|---|---|
| 00 | | LVL |
| 01 | | RVL |
| 02 | | P (L) |
| 03 | | P (H) |
| 04 | | ABSR (1) |
| 05 | VOICE A | ABSR (2) |
| 06 | | ENV |
| 07 | | SRC |
| 08 | | BNVX |
| 09 | | BHTX |
| 10~19 | VOICE B | |
| 20~29 | VOICE C | |
| 30~39 | VOICE D | |
| 40~49 | VOICE E | |
| 50~59 | VOICE F | |
| 60~69 | VOICE G | |
| 70~79 | VOICE H | |

FIG.7

| ADDRESS | REGISTER |
|---|---|
| 0C | KON |
| 1C | KOF |
| 2C | FMON |
| 3C | NON (NOISE ON) |
| ⋮ | ⋮ |
| 0D | MVL (L, R) |
| 1D | EVL (L, R) |
| 2D | EDL |
| 3D | EFB |
| 4D | EON |
| 5D | ESA |
| ⋮ | ⋮ |
| 0F~7F | $C_6$~$C_7$ (COEFFICIENT) |

FIG.8

AUDIO SYNTHESIZER TIME-SHARING ITS FIRST MEMORY UNIT BETWEEN TWO PROCESSORS

BACKGROUND OF THE INVENTION

This invention relates to a speech information processor advantageously employed in an electronic musical instrument or a television game device.

The sound source employed in general in an electronic musical instrument or a television game may be roughly classified into an analog sound source, comprising a voltage-controlled oscillator (VCO), a voltage-controlled amplifier (VCA), a voltage-controlled filter (VCF) etc., and a digital sound source, such as a programmable sound generator (PSG) or a zigzag readout type ROM.

As an example of the digital sound source, the JP Patent Kokai (Laid-Open) Patent Publication No. 62-264099 (1987) or the JP Patent Kokai (Laid-Open) Patent Publication No. 62-267798 (1987) discloses a sampler sound source in which sound source data sampled from the live instrument sound and digitally processed is stored in a memory for use as the sound source.

The above-mentioned sound source (sampler sound source) stores only sound source data of a pre-set pitch (interval) after compression by, for example, non-linear quantization. Each sound source data is stored in two parts, that is in a formant portion (FR) and a one-period portion (LP) of plural repeated waveforms of the fundamental period following the formant portion, as shown in FIG. 9. The formant portion is a signal waveform at the initial stage of sound production proper to each musical instrument, such as a sound produced when a key of a keyboard is struck until a hammer hits the string in the case of a piano. During readout of the sound source data, the formant portion is read out first and the one-period portion is read out a number of times.

Since the above sound source data is compressed, and only the required portions, that is the above formant portion and the one-cycle repetitive portion, are extracted and stored, a large quantity of sound source data may be stored in a smaller storage space.

As a general speech information processor for data processing of the sampler sound source, there is known an audio processing unit (APU) 107 consisting of a digital signal processing unit (DSP) 101, a memory 102 and a central processing unit (CPU) 103, as shown in FIG. 10.

In this figure, the APU 107 is connected to a host computer 104, provided in a typical personal computer, a digital electronic musical instrument or a TV game machine.

The host computer 104 includes a ROM cassette storing the above-mentioned sound source data, control programs, etc. The control program stored in the ROM cassette is read out by the CPU 103 so as to be stored in a working memory 103a therein.

The CPU 103 causes the sound source data to be read out from the ROM cassette and transiently stored in the memory 102 via the DSP 101, based upon the above-mentioned control program by way of performing writing control for the memory 102. The CPU 103 also controls the DSP 101 in accordance with the control program. The DSP 101 causes the sound source data stored in the memory 102 to be read out under control by the CPU 103 and processes the sound source data thus read out with, for example, bit expansion or pitch conversion. The DSP 101 also processes the sound source data with looping for reading out the repetitive portion of the sound source data a number of times. The sound source data, outputted by the DSP 101 after such processing operations, is fed by a D/A converter 105 and thereby converted into analog speech signals which are fed to a speaker unit 106. Thus an acoustic output corresponding to the speech sound data can be produced via the speaker unit 106.

The access time to the memory 102 by the CPU 103 and the DSP 101 is pre-set so that the CPU 101 accesses the memory 102 once after the DSP 101 accesses the memory twice. Consequently, when partially rewriting the sound source data of the memory 102, the CPU 103 controls the writing in the memory 102 so that the CPU reads out sound source data from the ROM cassette and writes the data in the memory 102 during the time the DSP 101 is not accessing the memory. This enables the acoustic output corresponding to the rewritten sound source data to be produced from the next time on. The present Assignee has filed a related patent application under the EP Publication No. 0543667 and a corresponding US patent application (now pending).

However, with the above speech information processor employing the APU 107, the memory 102 is used in common by the DSP 101 and the CPU 103, and the access time of the DSP 101 and the CPU 103 to the memory 102 is pre-set, such that the it is possible for the CPU 103 to have access to the memory only at the pre-set timing. Hence high-speed data transfer cannot be achieved.

Conversely, the high-speed CPU cannot be employed because high speed data transfer cannot be achieved.

If memory access is via an interrupt, for example, for achieving high-speed data transfer, when speech data is being read out by the DSP 101, speech data readout is necessarily interrupted, such that speech data outputting cannot be made continuously.

OBJECT AND SUMMARY OF THE INVENTION

In view of the above-depicted status of the art, it is an object of the present invention to provide an audio information processor in which, even if the memory is exploited in common by the CPU and the DSP, and the memory access time is pre-set, high-speed data transfer may be achieved without interrupting the DSP operations.

In one aspect, the present invention provides an apparatus for processing audio information comprising first execution means and second execution means for executing operations at respective different execution cycles, and first memory means for reading and recording the speech information. The first execution means and the second execution means exploit the first memory means in common for processing the audio information. The processing apparatus further comprises second memory means for storage of the audio information from the first execution means or the audio information read out from the first memory means. The first execution means record the audio information on or read the audio information from the second memory means during the execution cycle of the first execution means. The second execution means accesses the first memory means during the execution cycle of the second execution means for outputting the audio information to the outside. The audio information recorded in the second memory means is read out therefrom and recorded in the first memory means or the audio information recorded in the first memory means is read out therefrom and recorded in the second memory means during the time of not accessing the first memory means.

In another aspect, the present invention provides the above-defined processing apparatus further comprising a direct memory access controller for recording the audio information on or reproducing the audio information from the second memory means.

With the audio information processing apparatus according to the present invention, the execution cycles of the first execution means, for example, a central processing unit (CPU), and the second execution means, for example a digital signal processor (DSP), are pre-set so that two execution cycles of the DSP are carried out for each execution cycle of the CPU, and the first memory means for recording and readout of the audio information is alternately used by the CPU and the DSP by these different execution cycles for processing the audio information.

The first memory means is preceded by second memory means via which the audio information is written into and read out from the first memory means.

Specifically, the CPU, reading out the audio information from the sound source ROM of, for example, a TV game device, controls the writing in the second storage means for causing the audio information to be stored therein transiently. That is, the recording of the audio information in the second memory means is carried out during the execution cycle of the CPU.

If more than a pro-set quantity of the audio information is stored in the storage area of the second memory means, the DSP reads out the audio information stored in the second memory means during the time the DSP is not accessing the first memory means, such as during the execution cycle of the CPU, and controls the writing in the first memory means so that the audio information thus read out will be stored in the first memory means. That is, the recording of the audio information in the first memory means is carried out during the execution cycle of the DSP.

During its execution cycle, the DSP reads out the audio information stored in the first memory means and processes the audio information thus read out with, for example, bit expansion or pitch conversion. An output of the DSP, which is the audio information processed with bit expansion etc., is routed to a speaker device or the like. The speaker device produces an acoustic output corresponding to the audio information.

When reading out the audio information stored in the first memory means, the CPU directs the DSP to read out the audio information stored in the first memory means. This causes the audio information to be read out from the first memory means during the execution cycle of the DSP so as to be recorded in the second memory means. That is, the writing of the audio information in the second memory means in such case is carried out at the DSP timing.

When the audio information has been recorded in the second memory means, the CPU causes the audio information to be read out from the second memory means. That is, the writing of the speech information in the second memory means in such case is carried out at the CPU timing.

Even though the execution cycles of the CPU and the DSP are pre-set, and the first memory means is jointly used by the CPU and the DSP, transfer of the audio information between the CPU and the second memory means is carried out at the CPU timing by the operation of the second memory means, so that high-speed transfer becomes possible through the use of the CPU having the high transfer rate of the audio information.

On the other hand, since the transfer of the audio information between the second memory means and the first memory means is carried out at the DSP timing during the time the DSP is not accessing the first memory means, it becomes possible to transfer the audio information without interrupting the information processing by the DSP, so that continuous outputting of the audio information may be prevented from being interrupted.

The apparatus for processing the audio information according to the present invention includes a memory access controller (DMAC) in the second memory means for recording and readout of the audio information.

If the audio information is to be transferred, the DMAC routes a bus request signal to the CPU in order to obtain a permission of using the bus line. When fed with the bus request signal, the CPU interrupts the operation it is performing at an opportune point and routes an acknowledge signal permitting the use of the bus line to the DMAC. When fed with the bus acknowledge signal, the DMAC transfers the audio information read out from the CPU to the second memory means, or reads out the audio information stored in the second memory means in order to route the read-out audio information to the CPU.

In distinction from the CPU, performing the transfer of the audio information in accordance with the control program, the DMAC is a hardware designed for exclusive use in information transfer and hence is capable of faster information transfer than is possible with the CPU.

In sum, with the apparatus for processing the audio information according to the present invention, since the transfer of the audio information between the first execution means and the second execution means may be performed at the timing of the first execution means, the first execution means having a high rate of transfer of the audio information may be employed, thus rendering it possible to achieve high speed transfer.

On the other hand, since the transfer of the audio information between the second memory means and the first memory means is performed at the timing of the second execution means during the time the second execution means is not accessing the first memory means, the transfer of the audio information may be achieved without interrupting the information processing by the second execution means, so that the continuous outputting of the audio information may be prevented from being interrupted.

In addition, with the apparatus for processing the speech information according to the present invention, by employing the direct memory access controller (DMAC), the information transfer becomes possible without the involvement of the CPU, thereby making possible the faster information transfer than is possible with the CPU.

Furthermore, since it is possible to perform high speed transfer of the audio information, high-speed transfer of the audio information becomes possible between the first execution means and the first memory means, so that a vacant area can be formed in the first storage means. Such vacant area in the first memory mens may be exploited as a data storage for a host computer (RAM disc).

BRIEF DESCRIPTION OF THE DRAWINGS

FIG. 7 illustrates a map of control data on a register RAM provided in the DSP.

FIG. 8 illustrates a further map of control data on a register RAM provided in the DSP.

DESCRIPTION OF THE PREFERRED EMBODIMENT

Figure 1:
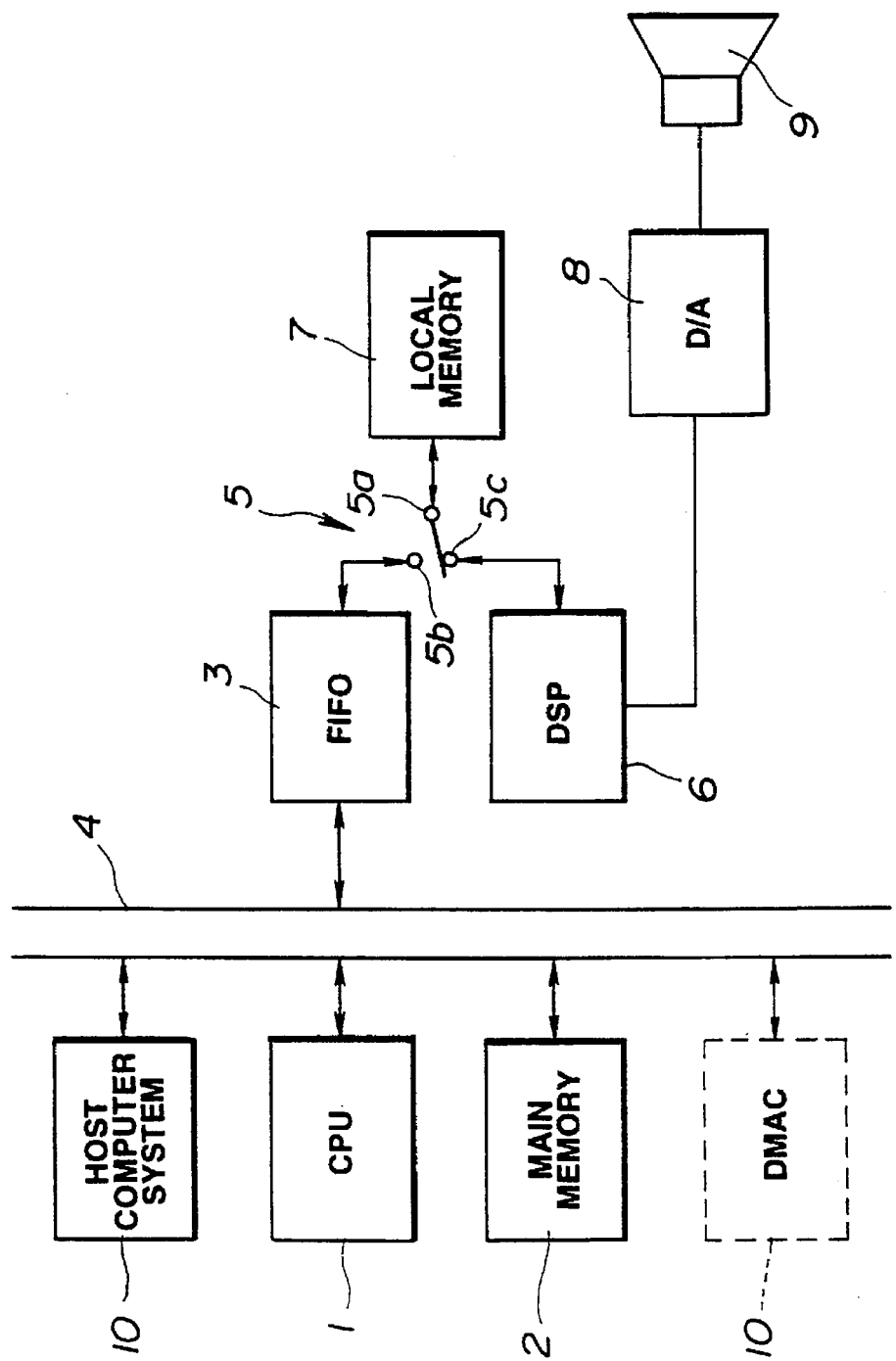
FIG. 1 is a block diagram showing a speech information processor embodying the present invention.

Referring to the drawings, a preferred embodiment of a speech information processor according to the present invention will be explained.

The speech information processor includes a central processing unit (CPU) 1, as first execution means, a main memory 2, in which control programs etc., for the CPU 1 are stored, and a first-in-first-out (FIFO) 3, as second memory means, which are interconnected via a bus line 4.

The FIFO 3 is connected to a movable contact 5a of a changeover switch 5, a fixed terminal 5c of which is connected to a sound source data input terminal of a digital signal processor (DSP) 6. The movable contact 5a of the changeover switch 5 is connected to a local memory 7 as first memory means. The DSP 6 has its sound source data output terminal connected to an input terminal of a D/A converter 8, an output terminal of which is connected to a speaker unit 9.

To the bus line 4 is connected a host computer 10, such as a television game device, having a sound source ROM with sound source data pre-stored therein.

Figure 9:
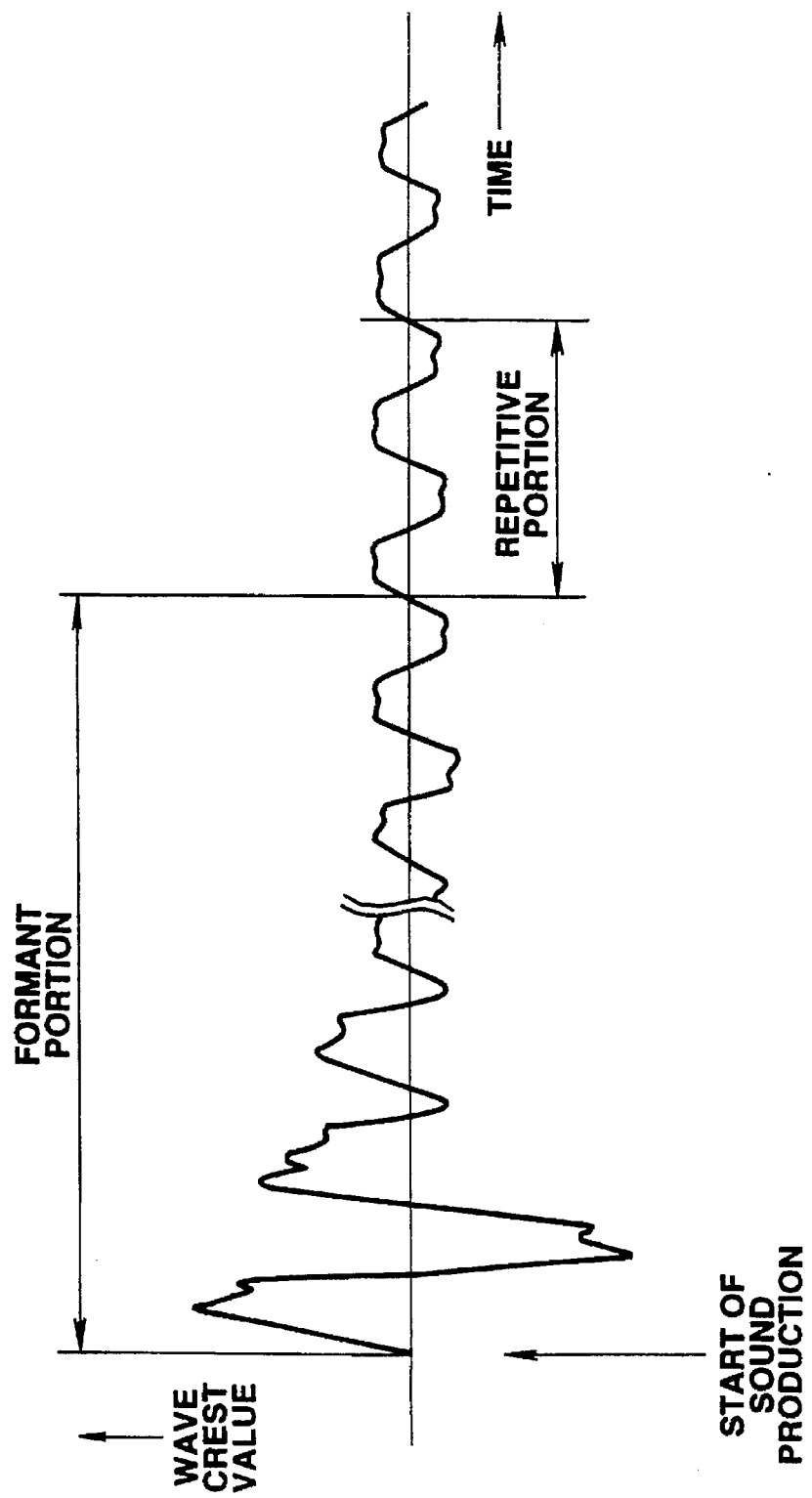
FIG. 9 illustrates sound source data of a non-interval portion and an interval portion separately stored in a sampler sound source.
Figure 10:
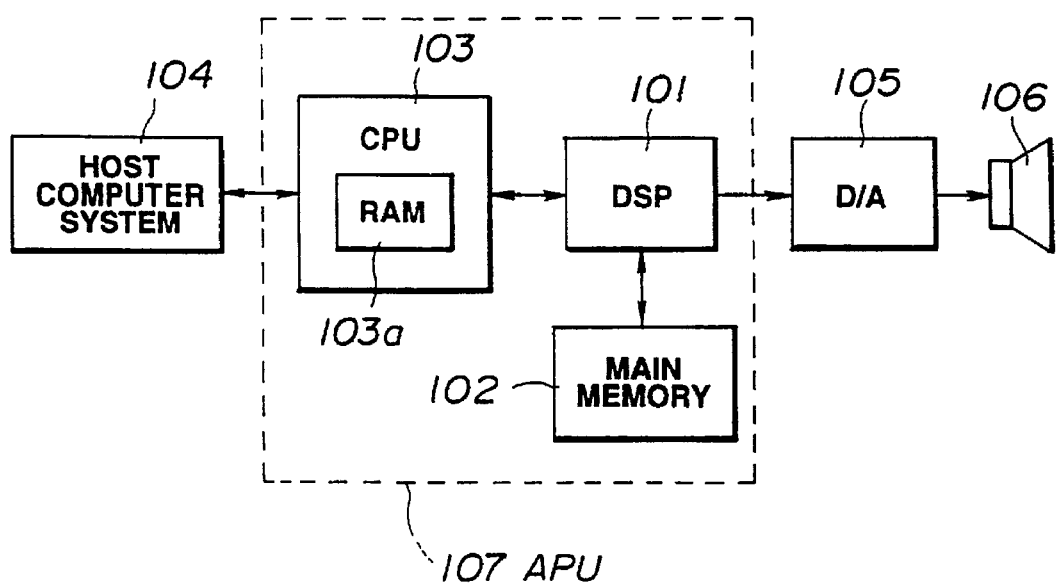
FIG. 10 is a block digram showing a conventional speech information processor.

In the sound source ROM of the host computer 10, 16-bit sound source data of various musical instruments, such as piano, saxophone or cymbals, are stored in a 4-bit compressed form. The sound source data having a non-interval portion, such as a formant portion FR shown in FIG. 9, as in the case of the sound source data of a piano, are stored divided into a non-interval portion and an interval portion (a repetitive portion LP shown in FIG. 9).

The local memory 7 has a storage capacity of, for example, 64 kbytes, with a memory access time being 330 nsec for each memory access operation. The programs for the CPU 1 are stored in the local memory 7 in addition to the sound source data. The local memory 7 is time-divisionally employed by the CPU 1 and the DSP 6, as will be explained subsequently.

The above-described speech information processor of the present embodiment operates as follows:

When the game is started, the CPU 1 causes the sound source data and the control programs to be read out from the sound source ROM of the host computer system 10 and routes the control program over the bus line 4 to the main memory 2, while routing portions of the control program and the sound source data over the bus line 4 to the FIFO 3. This stores the control program in the main memory 2, while transiently storing part of the control program and the sound source data in the FIFO 3.

Until the sound source data is stored in more than a pre-set amount in the FIFO 3, the DSP 6 controls the changeover switch 5 so that the movable contact 5a is set to the side of the fixed terminal 5c. When more than a pre-set amount of the sound source data is stored in the FIFO 3, the DSP 6 causes the movable contact 5a of the changeover switch 5 to be set to the side of a fixed terminal 5b if the DSP 6 is not accessing the local memory 7. The DSP 6 also has access to the FIFO 3. Thus the sound source data temporarily stored in the FIFO 3 is read out sequentially in the order it is stored in the FIFO so as to be routed to and stored in the local memory 7.

On the other hand, the DSP 6 changes the switch 5 so that the movable contact 5a is set to the side of the fixed terminal 5c during the execution cycle of the DSP 6 in order to have access to the local memory 7. This transmits the sound source data recorded in the local memory 7 to the DSP 6 via the changeover switch 5.

That is, data transfer between the CPU 1 and the FIFO 3 can be performed at the transfer rate of the CPU 1. Thus the CPU 1 having a high sound source data transfer rate may be employed to assure high-speed data transfer.

On the other hand, data transfer between the FIFO 3 and the local memory 7 and that between the local memory 7 and the DSP 6 can be performed at the transfer rate proper to the DSP 6. Besides, sound source data transfer between the FIFO 3 and the local memory 7 is performed during the time the DSP 6 is not accessing the local memory 7. Consequently, sound source data may be transferred without interrupting data processing by the DSP 6. Thus it becomes possible to prevent interruption of a continuous speech output.

The CPU 1 controls the DSP 6 to cause the sound source data stored in the local memory 7 to be read out if it is desired to process the sound source data stored in the local memory 7. Thus the DSP 6 changes the changeover switch 5 so that the movable contact 5a is set to the side of the fixed terminal 5b. Besides, during the time the DSP 6 is not reading out the sound source data stored in the local memory 7, the sound source data is read out from the local memory 7 and routed to the FIFO 3. That is, data transfer between the local memory 7 and the FIFO 3 can be performed at the transfer rate proper to the DSP 6.

If more than a pre-set amount of the sound source data is stored in the FIFO 3, the CPU 1 causes sound source data to be read out from the FIFO 3 and processes the read-out data in a pre-set manner during the time the DSP 6 is not accessing the local memory 7. That is, data transfer between the FIFO 3 and the CPU 1 can be performed at the transfer rate proper to the CPU 1. This enables data transfer rate from the local memory 7 to the CPU 1 to be increased. Consequently, a vacant area can be provided in the local memory 7 and can be employed for data storage (RAM disc) for e.g. a host computer.

Figure 2:
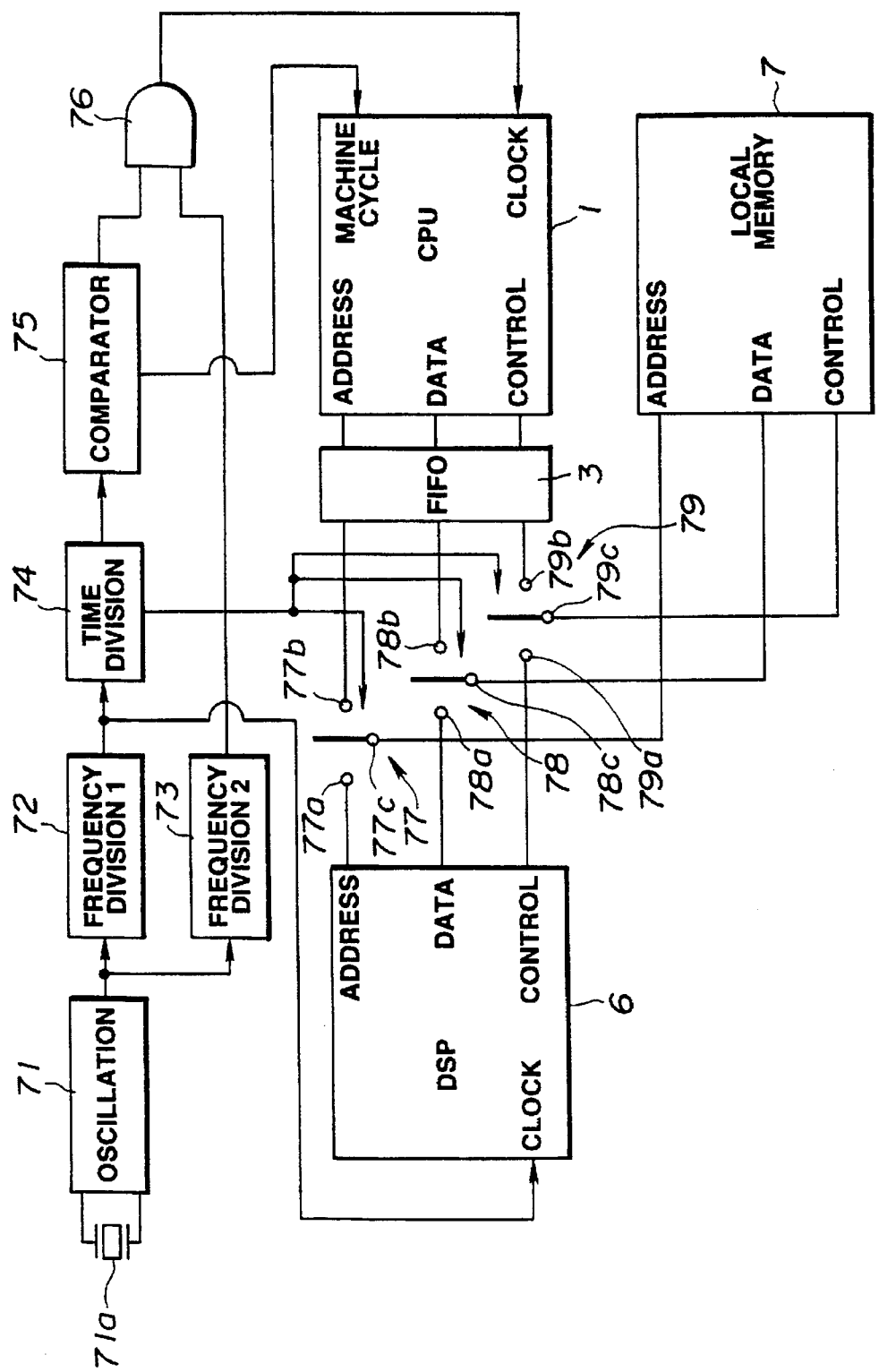
FIG. 2 is a block diagram of a synchronization circuit for controlling the CPU and the DSP provided in the speech information processor of FIG. 1 so as to exploit the local memory time-divisionally.

Memory access by the CPU 1 and the DSP 6 is controlled by a synchronization circuit shown for example in FIG. 2.

In the synchronization circuit, shown in FIG. 2, oscillating signals from an oscillator 71 connected to a quartz oscillating 71a are supplied to a first frequency divider 72 and a second frequency divider 73. The frequency divider 72 divides the oscillating signals in a pre-set manner to produce DSP clocks shown in FIG. 3a. These DSP clocks are supplied to clock input terminals of a time-multiplexing control circuit 74 and the DSP 6.

The time-multiplexing control circuit 74 generates time-divisional signals which go high and low alternately and repeatedly at an interval of four periods of the DSP clocks, with the eight periods of the DSP signals corresponding to one period of the time-divisional signals. These time-divisional signals are fed to first through third switches 77 to 79 and to a comparator 75.

The second frequency divider 73 has its frequency dividing ratio set to four times that of the first frequency divider 72. By dividing the oscillating signal from the oscillator 71 with this frequency dividing ratio, CPU clocks having the frequency equal to one-fourth the frequency of the DSP clocks outputted from the first frequency divider 72, as shown in FIG. 3C, are generated, and routes via an AND gate 76 to the CPU 1.

Figure 3:
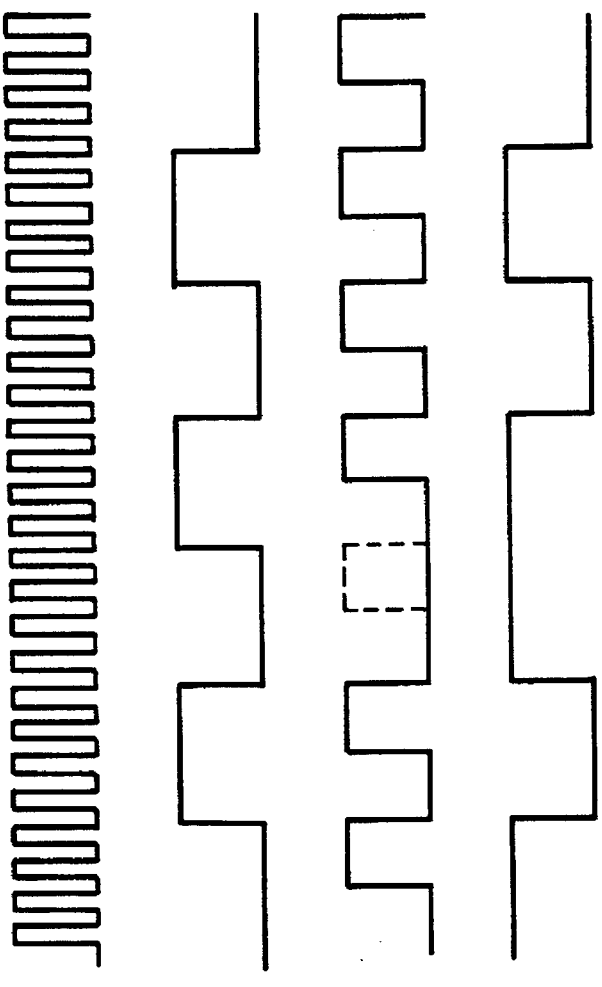
FIG. 3 is a timing chart for illustrating the operation of the synchronization circuit.

Based upon the CPU clocks, the CPU 1 generates machine cycle signals changed in synchronization with the time-multiplexed signals shown in FIG. 3b, as shown in FIG. 3d, and routes the machine cycle signals to the comparator 75.

The comparator 75 compares the phase of the time-multiplexed control signal from the time-divisional signal from the time multiplexing control circuit 74 and the machine cycle signal from the CPU 1. If the two signals are in phase with each other, a high-level coincidence detection signal is fed to the AND gate 76. Otherwise, a low-level coincidence detection signal is supplied to the AND gate 76. When fed with the high-level coincidence detection signal, the AND gate routes a CPU clock from the second frequency divider 73 to the clock input terminal of the CPU 1. However, when fed with the low-level coincidence detection signal, the AND gate gates the clock from the second frequency divider 73.

Consequently, when the two signals are not in phase with each other, the CPU clock which should be fed to the CPU 1 is gated by the AND gate 76 and ceases to be supplied to the CPU 1, such that the machine cycle of the CPU 1 is shifted a half cycle to assume a normal state.

Thus the synchronization circuit controls the memory access so that memory access by the CPU 1 occurs once for two memory access operations performed by the DSP 6.

Specifically, the access time of the local memory 7 is about 330 nsec, that of the DSP is about 240 nsec, each machine cycle of the CPU 1 is about 1 μsc and the memory access time of the CPU 1 is about 375 nsec within the machine cycle of the CPU 1.

Figure 4:
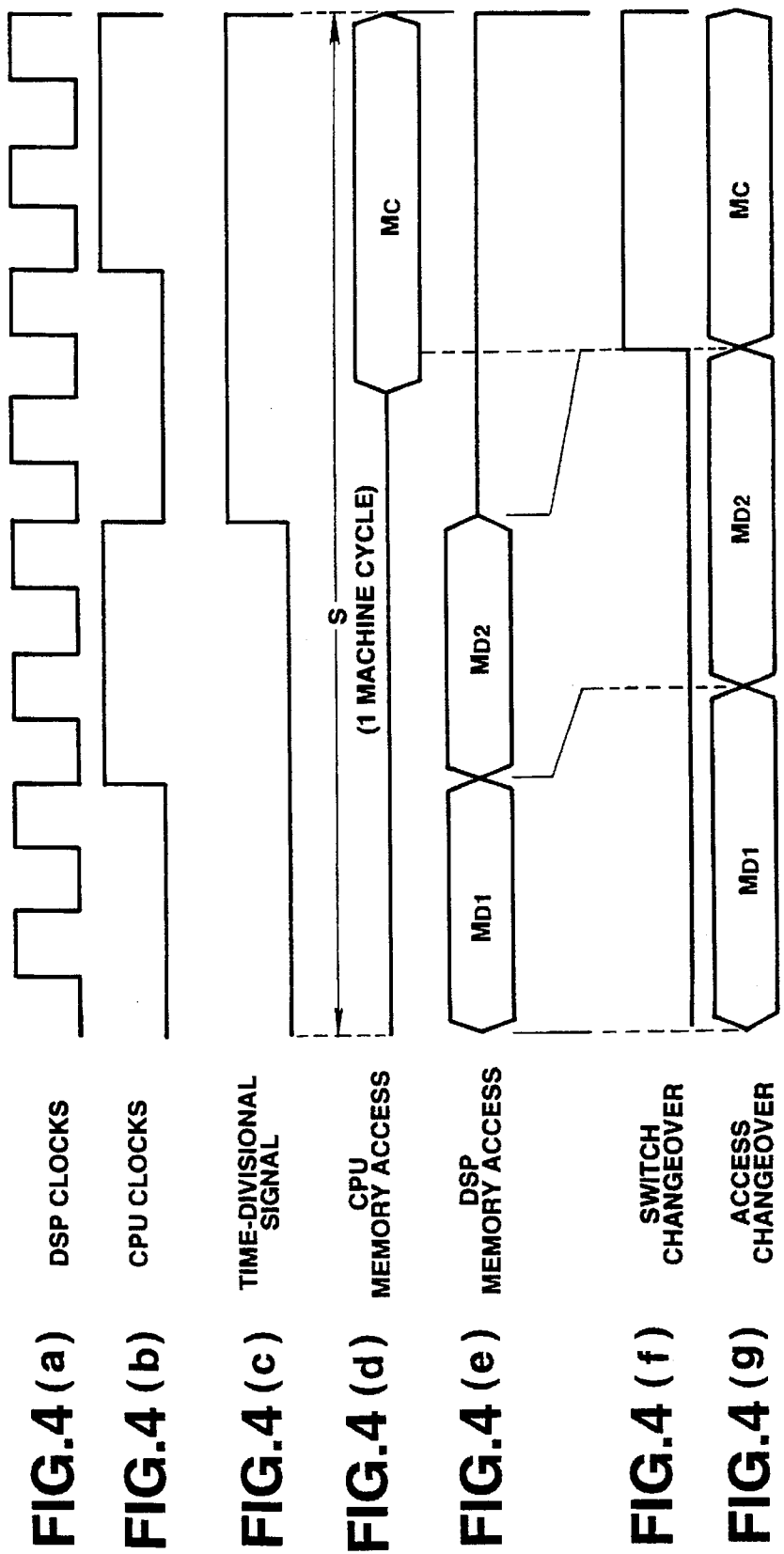
FIG. 4 is a timing chart for illustrating the operation of the synchronization circuit.

Assuming that the DSP clocks supplied to the DSP 6 by the synchronization circuit, the CPU clocks supplied to the CPU 1 and the time-multiplexed signal outputted from the time-multiplexing control circuit 74 are produced under a regular condition as shown in FIGS. 4a to 4c, the memory access time period Mc of the CPU 1 is set in the latter half of each machine cycle S, as shown in FIG. 4d, while two memory access time periods MD1, MD2 of the DSP 6 are set in the former half of the machine cycle S, as shown in FIG. 4e.

On the other hand, the access time of the local memory 7 is about 330 nsec, so that three accesses MD1, MD2 and MD3 are set at an equal interval in each machine cycle S, as shown in FIG. 4g.

Thus an offset is produced in the access time of the local memory 7, DSP 6 and the CPU 1. Such offset in the accessing time is adjusted by switching control of the first to third switches 77 to 79 by the time-multiplexing control circuit 74 shown in FIG. 2 and sound source data writing and readout via the FIFO 3.

That is, the time-multiplexing control circuit 74 generates changeover control signals shown in FIG. 4f, based on the time-multiplexed signal shown in FIG. 4c, and routes the time-multiplexed control signal to the first to third switches 77 to 79. Thus the first to third switches 77 to 79 are changed over to select the fixed terminals 77a to 79a by movable contacts 77c to 79c during the periods of the first access MD1 and the second access MD2 of the local memory 7, while being changed over to select the fixed terminals 77b to 79b by the movable contacts 77c to 79c during the period of the third access MC, as shown in FIG. 4g.

Thus the sound source data of the address bus line, data bus line and the control bus line of the local memory 7 are fetched in the DSP 6 during the first access period MD1 and the second access period MD2 of the DSP 6.

On the other hand, the sound source data of the address bus line, data bus line and the control bus line stored in the FIFO 3 are routed to the local memory 7 during the access period MC of the CPU 1.

Thus, with the speech information processor of the present embodiment, the local memory 7 is employed time-divisionally in common by the DSP 6 and the CPU 1. This improves the efficiency of the local memory 7 and enables the local memory 7 of a smaller storage capacity to be produced inexpensively, thereby lowering the production cost.

The local memory 7 stores the sound source data under the numbers of, for example, 0 to 255. The sound source data having a non-interval portion (formant portion shown in FIG. 9) is stored under numbers different from those for the interval portion (repetitive portion shown in FIG. 9). The sound source data is read out by eight sound source selection data SECa to SECh from the DSP 6. The sound source data read out by the eight sound source selection data SECa to SECh are routed to signal processors 20A to 20H shown in FIG. 1.

Figure 5:
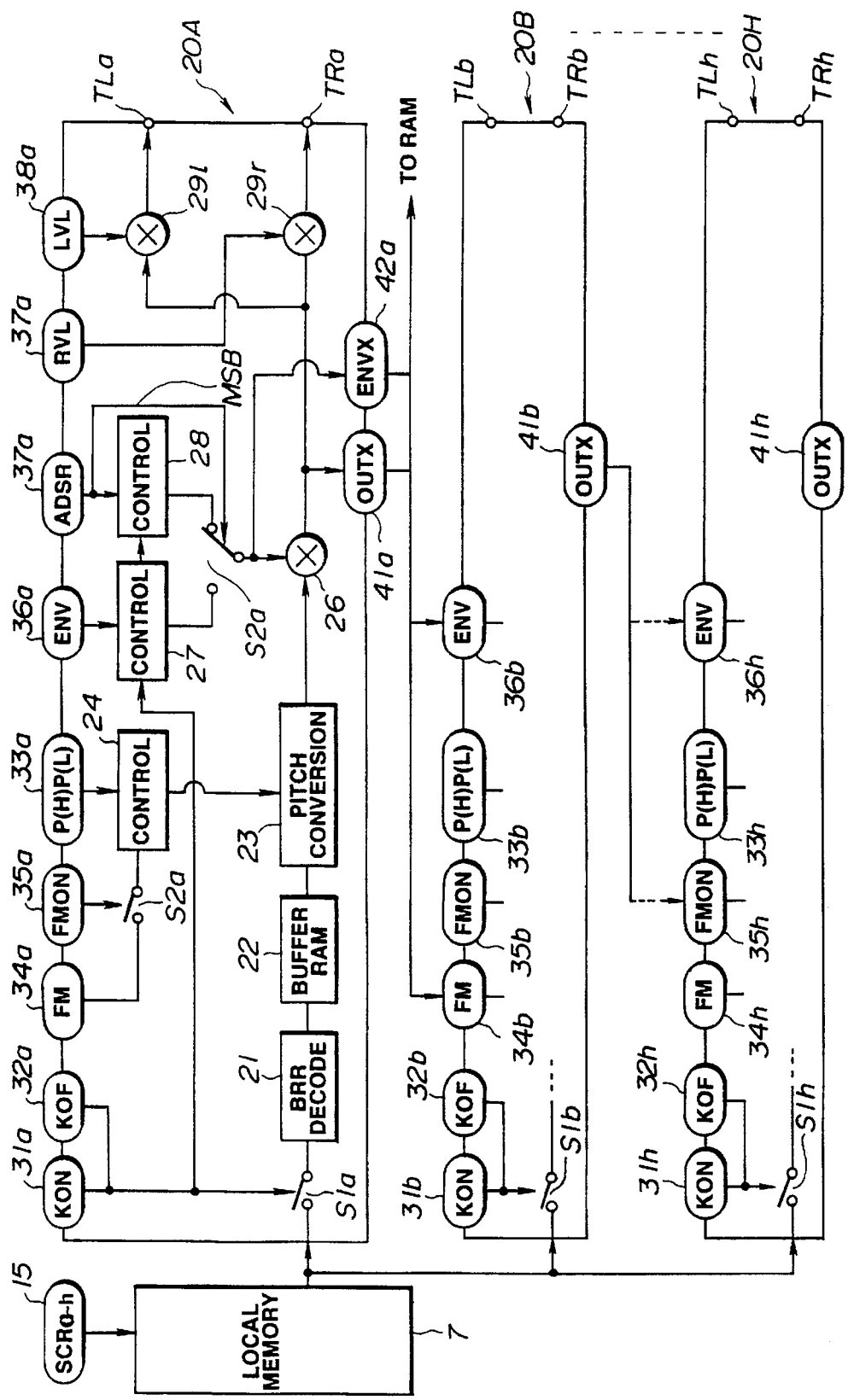
FIG. 5 is a block diagram showing a portion of the DSP provided in the speech information processor embodying the present invention.

If the sound source data, stored in the local memory by being divided into the non-interval portion and the interval portions, are read out, the non-interval portion of the sound source data is routed to the signal processor 20A, while the interval portions of the sound source data are routed to the signal processors 20B to 20H. The DSP 6 executes the above processing under software program control. This is explained for convenience by referring to the functional block diagrams shown in FIGS. 5 and 6.

The DSP 6 processes the eight sound source data (voice data) A to H time-divisionally for forming and outputting two channels (left and right channels). Specifically, the sampling frequency of the DSP 6 is set to 44.1 Khz, such that a sum total of 128 cycles of the processing operations, with each cycle being 170 nsec, is performed for eight sound source data and two channels within each sampling period (1/fs).

That is, the sound source data fed to the signal processors 20A to 20H are supplied to switches Sia to Sih. Each of the switches Sia to Sih is fed from a register RAM in the DSP 6 with control data KON designating the start (key-on) of sound production of each sound source data, or with control data KOF designating the cessation (key-off) of sound production of each sound source data, via terminals 31a to 31h, so as to be thereby turned on and off.

Each of the control data is made up of eight bits of data D0 to D7, these data D0 to D7 being associated with key-on and key-off of the sound source data A to H. The control data are written in separate registers.

Thus it suffices for the user to set a flag "1" for the sound source data desired to be keyed on or off, so that the laborious operation of preparing a program in which a bit not changed for each sound note is temporarily written in the buffer register may be eliminated.

The sound source data via the switches Sia to Sih are fed to a data expansion circuit 21 provided in each of the signal processors 20A to 20H. Since the sound source data are compressed from 16 bits to 4 bits and stored in this form in the sound source RAM, the data expansion circuit 21 expands the sound source data compressed to 4 bits to generate 16-bit sound source data which is supplied via a buffer RAM 22 to a pitch conversion circuit 23.

The pitch conversion circuit 23 is fed with pitch control data P(H) and P(L), such as processing parameters, from the register RAM via a terminal 33a and a control circuit 24. Thus the pitch conversion circuit 23 interpolates forward side four samples and rear side four samples by oversampling based upon the pitch control data P(H) and P(L) in order to perform pitch conversion with the same sampling frequency fs as that for the input sound source data.

If lower bits of the control data P(L) are set to 0, it becomes possible to prevent the interpolating data from being non-uniformly thinned out and hence to prevent fine pitch wobbling in order to produce the high-quality playback sound.

The switch S2a is adapted for being turned on and off by the control data FMON (FM-on) supplied from the register RAM via a terminal 35a. When the switch 2a is turned on by the control data FMON, sound source data such as the sound source data H is fed to the control circuit 24. When fed with such other sound source data, the control circuit 24 substitutes the sound source data for the pitch control data P(H) and P(L) in order to transmit the sound source data to the pitch conversion circuit 23.

Thus the sound source data A is frequency-modulated in the pitch conversion circuit 23, such that, if the modulating signal is of an extremely low frequency of several Hz, vibrato is applied to the modulated signal, whereas, if the modulating signal is of a variable frequency, the sound tone of the playback sound of the modulated signal may be variegated, so that it becomes unnecessary to provide a special sound source for modulation and the FM sound source can be produced by the sampler system.

The control data FMON is written in an eight-bit register, as is the control data KON, such that the data D0 to D7 of respective bits correspond to the sound source data A to H, respectively.

The sound source data via the pitch conversion circuit 23 are supplied to a multiplier 28. The multiplier is also fed via a terminal 36a, a control circuit 27 and a switch S3a with a control data ENV for controlling the envelope from the register RAM, while being also fed via a terminal 37a, a control circuit 28 and a switch S3a with a control data ADSR for ADSR control.

The switch S3a is changed over by the upper most bit (MSB) of the control data ADSR, such that, if the MSB of the control data ADSR is "1", the switch S3a is changed over to select the control data ADSR from the control circuit 28 (ADSR mode) and, if the MSB of the control data ADSR is "0", the switch S3a is changed over to select the control data ENV from the control circuit 28 (ENV mode).

When fed with the control data ENV, the multiplier 26 processes sound source data from the pitch conversion circuit 23 with envelope control such as fading. As for such envelope control, one of five modes, that is direct designation, linear fade-in, kinked line fade-in, linear fade-out and exponential fade-out, may be selected by the upper three bits of the control data ENV. The current wave crest value is adopted as the initial value of each mode.

It is noted that, if the sound source is a drum or a piano, the total sound production period is divided into an attack domain, a decay domain, sustain domain and a release domain, and the signal amplitude exhibits peculiar change state in each domain. Thus, when fed with the control data ADSR, the multiplier 26 performs a control operation of correspondingly changing the level of the sound source data of each voice on the sound source data from the pitch conversion circuit 23.

Specifically, with such control operation, the signal level is raised linearly only during the attack domain, while it is lowered exponentially during the three domains of decay, sustain and release. The time duration of the fade-in and fade-out is suitably set for each mode depending on parameter values specified by upper five bits of the control data ENV.

The time duration of the attack and sustain is suitably set depending on parameter values specified by upper and lower four bits of the control data ADSR, while the sustain level and the time duration of the decay and release is set depending on parameter values specified by each two bits of the control data ADSR.

With the present DSP 6, the signal level is raised linearly only for the attack period during the ADSR mode for decreasing the number of times of the arithmetic-logical operations. By switching the ADSR mode to the ENV mode, setting the attack domain to the kinked line fade-in and setting the three domains of decay, sustain and release to exponential fade-out, it is possible to manually perform spontaneous ADSR control operations.

By supplying output sound source data of the multiplier 26 via a terminal 41a to the register RAM and supplying the control data ENV via a terminal 42a to the register RAM for rewriting for each sample period, it becomes possible to produce speech signals of arbitrary envelope characteristics having significantly different pitches from the sound source data of the same musical instrument.

If the noise is employed as the effect sound, the noise data from an M-series noise generator, not shown, is supplied to the multiplier 26 in lieu of the sound source data from the pitch converter 23.

The sound source data from the multiplier 26 is fed to second and third multipliers 29l, 29r. The second multiplier 29l is fed with left sound volume control data LVL for controlling the left channel sound volume from the register RAM via a terminal 38a, while the third multiplier 29r is fed with right sound volume control data RVL for controlling the right channel sound volume from the register RAM via a terminal 39a.

The second multiplier 29l multiplies the sound source data with the left sound volume control data LVL for producing left channel sound source data having a pre-set sound volume and outputting the produced data via a terminal TLa. The third multiplier 29r multiplies the sound source data with the right sound volume control data RVL for producing right channel sound source data having a pre-set sound volume and outputting the produced data via a terminal TRa.

FIGS. 7 and 8 show maps for all of the control data on the register RAM.

Figure 6:
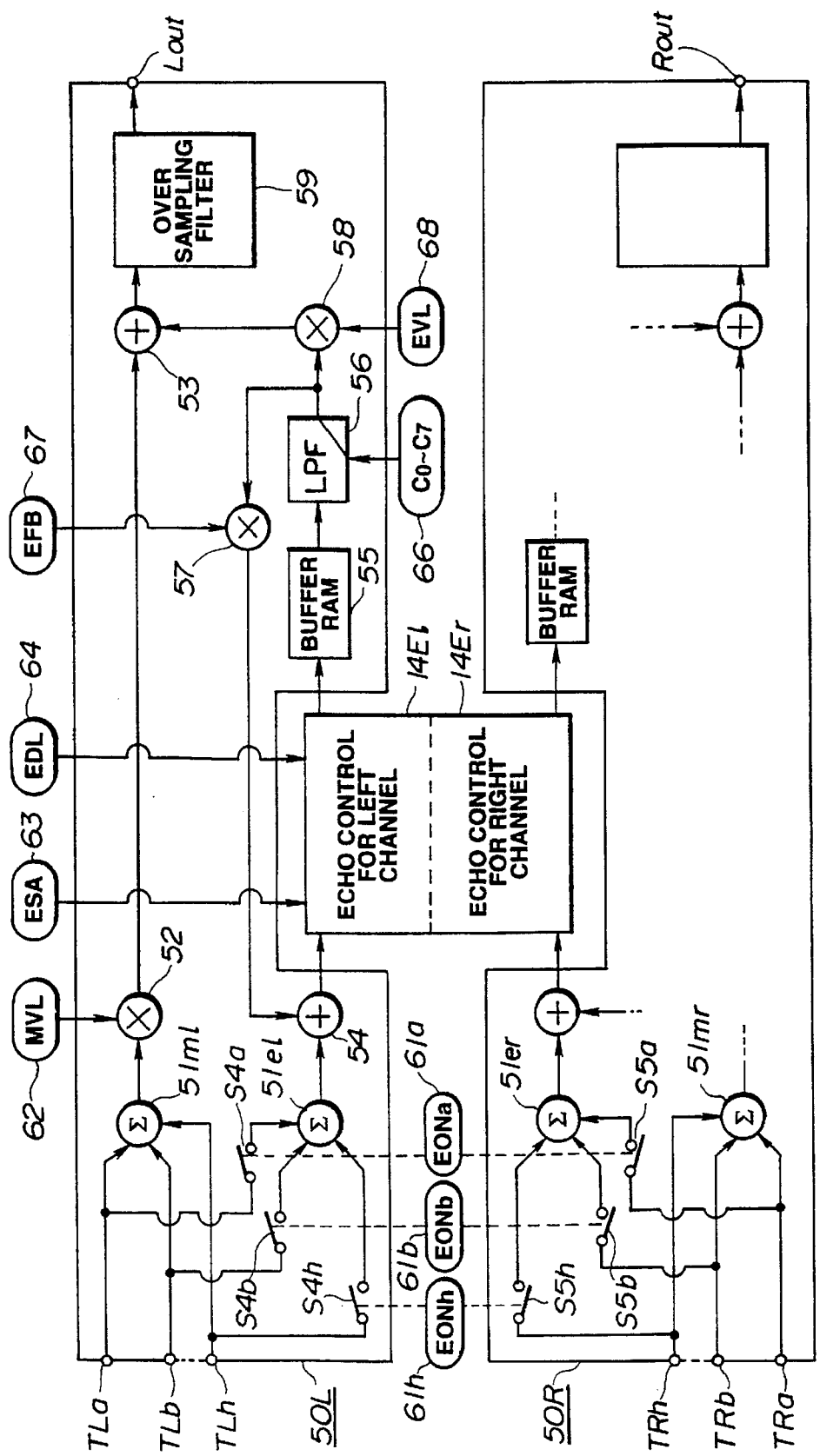
FIG. 6 is a block diagram showing another portion of the DSP provided in the speech information processor embodying the present invention.

Thus the left channel sound source data, generated by the signal processing units 20A to 20H, are supplied via terminals Tla to TLh shown in FIG. 6 to a left channel signal processing unit 50L, while the right channel sound source data are supplied via terminals Tra to TRh to a right channel signal processing unit 50L.

In the left channel signal processing unit 50L, the sound source data supplied via the terminals Tla to Tlh are fed to a main additive unit 51ml, while being fed via switches S4a to S4h to a subsidiary additive unit 51el.

In the right channel signal processing unit 5OR, the sound source data supplied via the terminals Tra to Trh are fed to a main additive unit 51mr, while being fed via switches S5a to S5h to a subsidiary additive unit 51er.

The additive units 51ml, 51mr add the sound source data supplied thereto via the terminals TL a to Tlh and Tra to Trh to supply the resulting sums to a multiplier 52.

The multiplier 52 is fed from the register RAM via a terminal 62 with control data MVL for controlling the main sound volume. The multiplier 52 multiplies the sound source data with the control data MVL to control the main sound volume of the sound source data and transmits the resulting product to an additive unit 53.

To the switches S4a to S4h and S5a to S5h of the signal processors 50L, 50R are routed control data EONa to EONh for adding the echo (reverberating sound) from the register RAM via terminals 61a to 61h. The sound source data (voice) to be added to with the echo is selected by these control data EONa to EONh.

When the signal processing of the non-interval component is performed by the signal processing unit 20A for the voice A, the switches S4a and S5a are controlled so as to be turned off so that no echo is added to the non-interval portion.

The control data EON is written in an 8-bit register, as shown in FIG. 8.

The subsidiary additive nodes 51el, 51et add the sound source data supplied via the switches S4a to S4h and S5a to S5h and transmit the resulting sum data to channel echo control units 14El, 14Rr via an additive unit 54.

The echo control units 14El, 14Er are fed via a terminal 64 with control data EDL (echo delay) for controlling the amount of the echo and control data ESA (echo start address) indicating the sound source data to be added to with echo. The echo control units 14EL, 14Er add echo to the sound source data from the subsidiary additive units 51el, 5let within the range of 255 msec so that the left channel echo and the right channel echo will be equal to each other, and transmits the resulting data via a buffer RAM 55 to a digital low-pass filter, such as a finite impulse response (FIR) filter 56.

The FIR filter 56 is fed from the register RAM via a terminal 66 with 8-bit coefficients C0 to C7, added to with codes, and has its filter characteristics variably controlled so that the echo sound will be produced which is spontaneous in psychoacoustic effects. The sound source data via the FIR filter 56 is supplied to multipliers 57, 58.

The multiplier 57 is supplied with control data EFB (echo feedback) from the register RAM via a terminal 57. The multiplier 57 multiplies the sound source data from the FIR filter 56 with the control data EFB and routes the resulting product to the additive unit 54. The additive unit 54 adds the sound source data from the subsidiary additive units 51el and 51Er to the sound data from the multiplier 57z and routes the resulting sum to the echo control units 14El and 14Er.

The multiplier 58 is fed with the control data EVL for controlling the amount of the echo sound from the register RAM via a terminal 68. The multiplier 58 multiplies the sound source from the FIR filter 56 by the control data EVL to adjust the sound volume of the echo in the sound source data and routes the resulting product to the additive unit 53.

The additive unit 53 sums the sound source data from the main additive units 51ml and 51mr to the sound source data from the multiplier 58 to add the echo to the sound source data from the multiplier 51mr, and outputs the resulting sum via an over-sampling filter 59 and a left-channel sound source data output terminal Lout and a right-channel sound source terminal Rout, respectively.

The sound source data outputted from the DSP 6 via output terminals Lout, Rout are fed to the D/A converter 8 shown in FIG. 1. The D/A converter 8 converts the sound source data into analog signals to form speech signals which are supplied to the speaker unit 9. Thus the speech corresponding to the sound source data is produced by the speaker unit 9.

The control data MVL for controlling the main sound volume and the control data for controlling the echo sound volume are 8-bit data devoid of codes and are independent of each other and with respect to the left and right channels. Thus the main speech signal and the echo signal may be adjusted in level independently of each other to render the speech produced by the speaker unit 9 sufficient in ambience.

In the above description, the sound source data read out from the sound source ROM of the host computer system 10 is written in the FIFO 3 under control by the CPU 1. However, a direct memory access controller (DMAC) 10 may also be provided as shown by a broken line in FIG. 1 for transferring the sound source data read out from the sound source ROM to the FIFO 3.

Since the DMAC is a hardware designed for use exclusively for data transfer, the sound source data may be transferred without the interposition of the CPU 1, so that faster data transfer may be achieved than is possible with the CPU 1.

In addition, in the above description, the local memory 7 has a storage capacity of 64 kbytes, and the memory access time is 330 nsec. However, these numerical values are merely illustrative. Thus the present invention is not limited to the numerical values given herein and may be modified in a desired manner without departing from the scope of the invention.

What is claimed is:

1. An apparatus for processing audio information, comprising:

first execution means and second execution means for executing operations at a first and a second execution cycle respectively, wherein said first execution cycle is different than said second execution cycle;

first memory means for storing audio information selectively supplied by either said first or said second execution means at respective transfer rates, said first memory means being used by said first and second execution means in common; and second memory means for storing audio information selectively supplied by either said first execution means or said first memory means, wherein said first execution means controls a transfer of audio information between said first execution means and said second memory means at said first execution cycle, and wherein said second execution means controls a first transfer of audio information between said first memory means and said second memory means and a second transfer between said second execution means and said first memory means at said second execution cycle such that said first transfer of audio information occurs only if said second transfer does not occur.

2. The apparatus according to claim 1, wherein said first memory means includes a Random Access Memory (RAM) disc.

3. The apparatus according to claim 1, further comprising a direct memory access controller for writing audio information in or reading audio information from said second memory means.

4. The apparatus according to claim 1, further comprising synchronization means for providing timing signals to said first and second execution means.

5. The apparatus according to claim 4, wherein said synchronization means includes a transmitting circuit for providing a signal at a predetermined frequency and including first and second frequency dividing means for dividing said predetermined frequency of said signal, thereby providing frequency-divided signals to said first and second execution means, respectively.

6. The apparatus according to claim 5, wherein said frequency-divided signals are supplied to clock inputs of said first and second execution means.

7. The apparatus according to claim 6, wherein said synchronization means comprises comparator means for comparing signals, and wherein said first execution means includes a machine cycle signal outputted therefrom, said comparator means comparing said machine cycle signal with one signal of said frequency-divided signals and generating an output signal for controlling said first execution means.

8. The apparatus according to claim 7, further comprising a logical circuit for applying a boolean AND operation to said output signal and to another signal of said frequency-divided signals for directly controlling said first execution means.

9. The apparatus according to claim 8, further comprising time multiplexing control means connected between said first frequency dividing means and said comparator means, and wherein said second memory means includes a first-in-first-out (FIFO) memory for transiently storing an output signal from said first execution means, said FIFO memory providing a FIFO output signal therefrom such that said FIFO output signal and an output signal from said second execution means are changed over by said time multiplexing control means.

10. The apparatus according to claim 9, wherein said FIFO output signal, said second execution means output signal and an output signal from said first memory means are changed over by said time multiplexing control means.

* * * * *

UNITED STATES PATENT AND TRADEMARK OFFICE
CERTIFICATE OF CORRECTION

PATENT NO. : 5,640,489

DATED : June 17, 1997

INVENTOR(s) : Makoto Furuhashi

It is certified that error appears in the above-identified patent and that said Letters Patent is hereby corrected as shown below:

Column 10, line 65, change "SOL" to --50R--;

Column 12, line 24, change "(DMAC) 10" to --(DMAC) 11--;

Column 12, line 28, insert --11-- after "DMAC";

Fig. 1, change the reference number "DMAC 10" to --DMAC 11--.

Signed and Sealed this

Seventeenth Day of April, 2001

*Attest:*

NICHOLAS P. GODICI

*Attesting Officer*    *Acting Director of the United States Patent and Trademark Office*